United States Patent
Halstead et al.

(10) Patent No.: US 12,217,076 B2
(45) Date of Patent: Feb. 4, 2025

(54) VIRTUAL DEVICE ENROLLMENT AND MANAGEMENT

(71) Applicant: Omnissa, LLC, Mountain View, CA (US)

(72) Inventors: Chris Halstead, Nottingham, MD (US); Jared Cook, Bellevue, WA (US); Kevin B. Sheehan, Bloomfield, CT (US)

(73) Assignee: Omnissa, LLC, Mountain View, CA (US)

( * ) Notice: Subject to any disclaimer, the term of this patent is extended or adjusted under 35 U.S.C. 154(b) by 471 days.

(21) Appl. No.: 17/644,873

(22) Filed: Dec. 17, 2021

(65) Prior Publication Data

US 2023/0195493 A1   Jun. 22, 2023

(51) Int. Cl.
*G06F 9/455* (2018.01)
*G06F 21/60* (2013.01)
*G06F 21/73* (2013.01)

(52) U.S. Cl.
CPC ........ *G06F 9/45558* (2013.01); *G06F 21/602* (2013.01); *G06F 21/73* (2013.01); *G06F 2009/4557* (2013.01)

(58) Field of Classification Search
CPC .... G06F 9/45558; G06F 21/602; G06F 21/73; G06F 21/44; G06F 2009/4557
See application file for complete search history.

(56) References Cited

U.S. PATENT DOCUMENTS

| | | | |
|---|---|---|---|
| 2004/0151315 A1* | 8/2004 | Kim | H04N 21/8193 348/E7.056 |
| 2006/0075408 A1* | 4/2006 | Powers | G06F 9/5072 718/100 |
| 2006/0107194 A1* | 5/2006 | Gale | G06F 9/4411 715/764 |
| 2006/0116841 A1* | 6/2006 | Baekelmans | H04L 67/025 702/121 |
| 2007/0260581 A1* | 11/2007 | Hiller | H04L 12/1868 |
| 2008/0270695 A1* | 10/2008 | Ninose | G06F 3/0607 711/E12.001 |
| 2009/0083522 A1* | 3/2009 | Boggs | G05B 19/056 712/E9.023 |
| 2009/0113430 A1* | 4/2009 | Riley | G06F 21/606 710/316 |
| 2010/0042828 A1* | 2/2010 | Masui | H04L 9/0825 713/168 |
| 2014/0018039 A1* | 1/2014 | Lau | H04W 8/20 455/411 |
| 2014/0090028 A1* | 3/2014 | Matsugashita | G06F 21/41 726/4 |

(Continued)

*Primary Examiner* — Tuan C Dao
(74) *Attorney, Agent, or Firm* — Kim & Stewart LLP

(57) ABSTRACT

Enrollment management for virtual devices is described. In some examples, an enrollment agent of a virtual device retrieves a serial number using an operating system command that identifies the serial number locally to the virtual device. A request to identify device records with the management service is transmitted along with the serial number. A management identifier is received for a device record that is associated with the serial number. A local device management parameter of the virtual device is set to specify the management identifier. An enrollment request is transmitted to the management service.

17 Claims, 5 Drawing Sheets

(56) References Cited

U.S. PATENT DOCUMENTS

| | | | |
|---|---|---|---|
| 2015/0381547 A1* | 12/2015 | Mandanapu | G06Q 30/016 |
| | | | 709/206 |
| 2017/0195457 A1* | 7/2017 | Smith, II | H04L 63/10 |
| 2017/0371937 A1* | 12/2017 | Shah | G06F 8/71 |
| 2018/0176017 A1* | 6/2018 | Rodriguez | H04L 63/20 |
| 2018/0270066 A1* | 9/2018 | Doyon | H04N 21/25816 |
| 2019/0354675 A1* | 11/2019 | Gan | G06F 11/0712 |
| 2022/0374518 A1* | 11/2022 | Wang | G06F 21/1066 |

* cited by examiner

VIRTUAL DEVICE ENROLLMENT AND MANAGEMENT

BACKGROUND

An enterprise can manage access to a suite of applications and enterprise resources can be managed using a management service. The management service can enable administration of management policies, compliance rules, and configuration data which is defined and enforced by the management service. Many different kinds of devices are being used for access to enterprise computing systems and resources. With the growing number of different devices, platforms, and operating systems available for adoption by users, various challenges can arise in the management of the devices. One solution can include provisioning virtual desktops or virtual devices with the various applications and resources for enterprise users.

Users can access virtual desktops using a variety of different types of devices. A virtual desktop can also provide a consistent user experience across multiple devices. However, enrolling virtual desktops for management by a management service can pose a number of additional problems. For example, a network service that provides virtual desktops can create and destroy the virtual desktops on demand and in far greater numbers than typical physical device turnover. This can cause a large number of non-existent virtual desktops to be shown in a management console. Administrators may be unable to differentiate between virtual desktops that are in use and those that no longer exist.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to enrollment of virtual devices for unprivileged users. Many different kinds of devices are being used for access to enterprise computing systems and resources. With the growing number of different devices, platforms, and operating systems available for adoption by users, various challenges can arise in the management of the devices. One solution can include provisioning virtual desktops and other virtual devices with the various applications and resources. Users can access virtual desktops using a variety of different types of devices. A virtual desktop can also provide a consistent user experience across multiple devices. However, enrolling virtual desktops for management by a management service can pose a number of additional problems. For example, a virtualization service that provides virtual desktops and other virtual devices can create and destroy the virtual devices on demand and in far greater numbers than typical physical device turnover. This can cause a large number of non-existent virtual devices to be shown as managed in a management console. Administrators may be unable to differentiate between virtual devices that are in use and those that no longer exist. However, the present disclosure describes mechanisms that can enable enrollment and management of virtual devices.

For example, the mechanisms can include an enrollment assistant or enrollment agent executed in the virtual device that can minimize duplication and can create tags that identify virtual device pools, virtualization brokers, connector service, and device identifiers associated with a virtual device. The mechanisms can include a connector service that can communicate with a virtualization service and a management service. The connector service can manage mismatches between enrolled virtual devices and virtual devices that are actually provided by the virtualization service. The connector service can also manage tags that are created through the enrollment of virtual devices.

Figure 1:
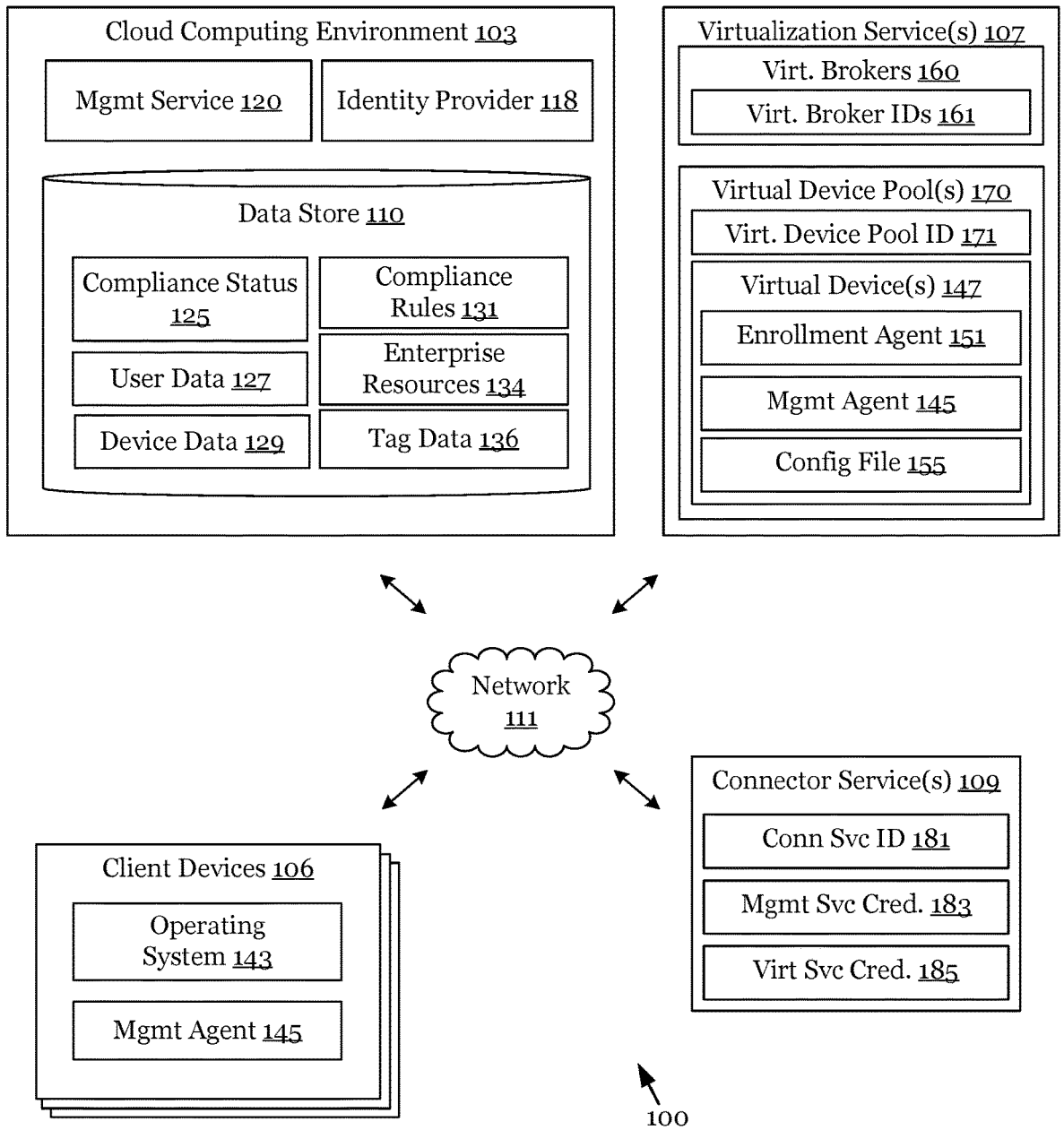
FIG. 1 illustrates an example networked environment that includes components that provide virtual device enrollment and management, according to various examples described herein.

FIG. 1 illustrates an example networked environment 100 that includes components that provide data-at-rest security for managed client devices using an extended set of volume encryption data. The networked environment 100 can include a cloud computing environment 103, several client devices 106, and virtualization services 107 in communication through a network 111. The components of the networked environment 100 can enable secure enrollment of virtual devices for unprivileged users.

The cloud computing environment 103 can be embodied as one or more computers, computing devices, or computing systems. In certain embodiments, the cloud computing environment 103 can include one or more computing devices arranged, for example, in one or more server or computer banks. The computing device or devices can be located at a single installation site or distributed among different geographical locations. The cloud computing environment 103 can include a plurality of computing devices that together embody a hosted computing resource, a grid computing resource, or another distributed computing arrangement. In some cases, the cloud computing environment 103 can be embodied as an elastic computing resource where an allotted capacity of processing, network, storage, or other computing-related resources vary over time. As further described below, the cloud computing environment 103 can also be embodied, in part, as certain functional or logical (e.g., computer-readable instructions) elements or modules as described herein.

The cloud computing environment 103 can operate as an environment for mobile device management and a unified endpoint management (UEM) platform that can manage the client devices 106, fixed drives, and other devices and endpoints. In that context, the cloud computing environment 103 includes a data store 110. The cloud computing environment 103 can also execute a management service 120 and an identity provider 118, among other processes. The data store 110 includes areas in memory for the storage of compliance statuses 125, user data 127, device data 129, compliance rules 131, enterprise resources 134, and tag data 136, among other types of data. A compliance status 125, a set of device data 129, and a set of compliance rules 131, can be maintained for each client device 106 and each virtual device 147. The management service 120 can operate as a UEM platform that can manage client devices 106, virtual devices 147, and other endpoints that are enrolled as managed physical and virtual devices with the management service 120.

The network 111 can include the Internet, intranets, extranets, wide area networks (WANs), local area networks (LANs), wired networks, wireless networks, cable networks, satellite networks, other suitable networks, or any combinations thereof. As one example, the cloud computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the cloud computing environment 103, the virtualization services 107, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The identity provider 118 can provide single sign-on or identity management capabilities for an enterprise. The identity provider 118 can allow users to authenticate his or her identity to obtain an authentication token that can be provided to a virtualization service 107. The identity provider 118 can utilize OAuth, security assertion mark-up language (SAML), or other single sign-on methodologies. The identity provider 118 and management service 120 can communicate so that the management service 120 can revoke or authorize access to various services for users in the enterprise based on status of a client device 106 assigned to the user. The identity provider 118 can also rely on user data 127 in the data store 110. In some examples, the identity provider 118 can rely upon a separate source of user data in a separate data store.

The management service 120 can transmit compliance rules 131, including security baselines, policies, profiles, and configuration data for execution by and/or enforcement on the client device 106. Security baselines, policies, profiles, and configuration data can also be enforced for virtual devices 147 accessed using a client device 106. In that context, during or after enrollment of a virtual device 147 or a client device 106, the management service 120 can retrieve or generate a set of management policies, compliance rules 131, and other configuration data and transfer those policies, rules, and data for enforcement by a management agent 145 or other management instructions executed by a client device 106 or a virtual device 147.

The management service 120 can also provide a management console as an engine and console interface for device management of the client devices 106. An information technology administrator or user, for example, can view, administer, and update the management policies, compliance rules 131, and configuration data on the client devices 106 using the management console. The policies, rules, and configuration data can be collectively administered for several of the client devices 106 by organizing the client devices 106 into several different groups or categories of devices, according to organizational or other factors or considerations. The management service 120 can ensure compliance of the virtual devices 147 and client devices 106 in conjunction with the management agent 145 and other instructions executed by the cloud computing environment 103, the virtual device 147, and the client device 106.

The client devices 106 are representative of one or more client devices 106. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communication devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the management service 120 for device management. A management agent 145 can be installed on a client device 106 to locally manage the device on behalf of the remotely executed management service 120. The management agent 145 can be installed with elevated privileges or be effectuated through operating system APIs to manage the client device 106 on behalf of the management service 120. The management agent 145 can have the authority to manage data on the client device 106, install, remove, or disable certain applications, or install configuration profiles, such as VPN certificates, Wi-Fi profiles, email profiles, etc.

User data 127 represents information about users who have user accounts in the enterprise. These users can have one or more client devices 106 that are enrolled as managed devices with the management service 120. These users can utilize enrolled and unenrolled client devices 106 to access virtual devices 147 that can provide access to enterprise resources 134. User data 127 can include authentication data, and information about user accounts with the management service 120, accounts with an enterprise domain, and other accounts. The account status as an unprivileged account or a privileged account can also be indicated.

The device data 129 can include device records for devices including client devices 106 and virtual devices 147. The device record can include information about each device. For example, the device record can indicate a user account, a group identifier, and organization identifier, which can indicate a user, department, and enterprise associated with the device. The organizational identifier can identify an enterprise or customer of the management service 120 among other enterprises that utilize the management service 120. In some cases, a particular enterprise or organization can be associated with one or more virtualization brokers 160 of the virtualization service 107, as well as one or more virtual device pools 170.

Each device record can also include a device serial number, a management universally unique identifier (UUID), and a management unique device identifier (UDID). The management UUID can be a UUID that is created during the enrollment process. The management UDID can be a UDID that is created during the enrollment process. Generally, the management UUID and the management UDID can each be used as unique identifiers assigned to a client device 106 or a virtual device 147 upon enrollment. The device record can include one or both of these identifiers among various embodiments.

The management UUID can include a 128-bit integer, or another format. The management UDID can include a hash of the serial number, or can be generated using an algorithm that does not take the serial number as an input. The serial number for a client device 106 can be assigned by the manufacturer or device provider. However, the serial number for a virtual device 147 can be assigned by the virtualization service 107.

The management UUID and the management UDID can be assigned to a client device 106 or a virtual device 147 by the management service 120 at enrollment time, upon account creation, or another time. If an enrollment request from a client device 106 or a virtual device 147 is received along with an existing management UUID or management UDID, then the device record will be updated rather than creating a new device record with a new management UUID and management UDID.

The device data 129 can also include a mapping that maps compliance rules 131 to a user account, as well as to client devices 106 and virtual devices 147. The device data 129 can also identify user data 127 such as one or more users or user accounts that are associated with a particular client device 106 or virtual device 147. The device data 129 can also reference or include the compliance status 125 for a particular client device 106 or virtual device 147.

Once a client device 106 or virtual device 147 is enrolled for device management by the management service 120, the management service 120 can direct the installation of various software components or applications on the client device 106. The software components can be configured on the client device 106 at the direction of the management service 120. Such software components can include, for example, applications, resources, libraries, and other related components.

The virtualization services 107 can be embodied as one or more computers, computing devices, or computing systems. Like the cloud computing environment 103, the virtualization service 107 can include one or more computing devices arranged, for example, in one or more server or computer banks. The computing device or devices can be located at a single installation site or distributed among different geographical locations. The virtualization service 107 can include a plurality of computing devices that together embody a hosted computing resource, a grid computing resource, or other distributed computing arrangements. The virtualization service 107 can also be embodied, in part, as certain functional or logical (e.g., computer-readable instructions) elements or modules as described herein.

The virtualization services 107 can include one or more virtualization brokers 160 that can manage the provisioning of virtual devices 147, including configuration, modification, creation, deletion, and other provisioning actions. The virtualization services 107 can be first party and third party services provided by an enterprise to its users. The virtualization services 107 can also be provided using the cloud computing environment 103 of the management service 120, and can include first party and third party services with respect to the management service 120. A virtualization service 107 can include a service that provides virtual desktops in a virtual desktop infrastructure (VDI) virtualization solution, remote desktops in a remote desktop session hosts (RDSH) virtualization solution, and other virtual devices 147 that can be accessed using client devices 106. The management service 120 can manage access to the virtual devices 147. The virtual devices 147 can include virtual desktops, remote desktops, virtual application services, and other types of virtual devices 147.

The virtual devices 147 can be launched as a clone such as a full clone, linked clone, or instant clone based on a virtual machine golden image or another parent virtual machine. The virtual device 147 can include a persistent or a non-persistent virtual device 147. The virtual device 147 can be launched from a powered-on virtual machine or a powered-off virtual machine image. The parent virtual machine can be configured using a console user interface of a virtualization service 107 or the management service 120. This can include a user interface through which agent privilege elevation components and agent privilege elevation rules can be specified.

A full clone virtual device 147 can include a fully independent child virtual machine that has virtual disks and memory that operate separately from, and share no system resources with, the parent virtual machine after the cloning operation. A linked clone virtual device 147 can include a child virtual machine that shares virtual disks with the parent virtual machine in an ongoing manner. A linked clone virtual device 147 can be made from a snapshot of the parent virtual machine and can use snapshot-based delta disks. A delta disk represents the difference between the current state of the virtual disk and the state that existed at the time that the previous snapshot was taken. The child disks employ a copy-on-write (COW) mechanism, in which the virtual disk contains no data in places until copied there by a write. This optimization can conserve storage space.

An instant clone virtual device 147 can be a child virtual machine that shares virtual disks and memory with the parent virtual machine in an ongoing manner. Like the linked clone virtual device 147, an instant clone virtual device 147 also can be made from a snapshot of the parent virtual machine and can use snapshot-based delta disks. An instant clone virtual device 147 also shares the memory state of the parent virtual machine to deliver efficient memory use. Instant clone virtual devices 147 can be created in a powered-on state with the virtual machine ready for users to connect, and can include the guest applications of the parent virtual machine prior to provisioning and with a memory state indicated in the snapshot along with the virtual disk state.

Instant clone virtual devices 147 can include mode A virtual devices 147 and mode B virtual devices 147. Mode A instant clone virtual devices 147 can be created from a running virtual machine instead of a powered-off virtual machine, and can function much like a container. Mode B instant clone virtual devices 147 can be created from a powered-off virtual machine image, and can lack a running parent virtual machine. Instant clone virtual devices 147 can be non-persistent, and can be launched when requested, accessed, or logged in, and can be closed on logout to free up resources. Where the instant clone virtual devices 147 are non-persistent, duplication of device records can occur on every enrollment, and the enrollment can occur at every login. However, the mechanisms described herein can prevent duplicate device records.

A virtual device 147 can include an operating system 143, a management agent 145, as well as a suite of applications. The virtual device 147 can be provided using a virtual machine, a container, or another type of virtual device. The virtual device 147 can be executed using one or more physical host devices that provide hardware resources. The virtual devices 147 can have access to enterprise resources 134 specified according to the compliance rules 131. Enterprise resources 134 can include applications, databases, scripts, directories, files, and other resources that are used to perform enterprise activities.

A virtual device 147 can include an enrollment agent 151, a management agent 145, a configuration file 155, and an operating system, as well as other executable instructions, applications and files. The virtual device 147 can also include or be associated with agent privilege elevation components including agent privilege elevation rules and executable privilege elevation programs. The agent privilege elevation components can indicate and enable privilege elevation for applications specified according to folder name and path, file name and path, file hash, as well as files signed with a certificate from a particular publisher or certificate authority. The privilege elevation can cause the specified files to be executed with elevated or administrative privilege while having the security context of a logged-in non-administrative or unprivileged user account. The elevated privilege can be provided a privilege associated with a local security authority subsystem service or process of an operating system of the virtual device 147.

The operating system of the virtual device 147 can include a WINDOWS® operating system such as WINDOWS® 10, WINDOWS® 11, or another operating system. The virtual machine's operating system can include an operating system that is the same as, or different from, the operating system 143 of the client device 106.

The enrollment agent 151 can include an executable component that enrolls the virtual device 147 with the management service 120 for management. The enrollment agent 151 can be an executable process that fails unless it is executed as a privileged process. A token manager can create a privilege elevated token that can be used to execute the enrollment agent 151 as a privileged process. The privilege elevated token can be created by using a privileged token of a local security authority subsystem service or process, and specifying a logged-in non-administrative or unprivileged user account. The enrollment agent 151 in some examples can include an application wrapper that wraps the management agent 145. In some cases, the enrollment agent 151 can use components of the management agent 145 to perform all or a subset of communications discussed as performed by the enrollment agent 151.

The configuration file 155 can be an encrypted file that includes encrypted configuration data for the virtual device 147. The encrypted configuration data can include enrollment credentials that authenticate an enrollment request to enroll the virtual device 147 with the management service 120. The privilege elevation rules can specify that the enrollment agent 151 and the management agent 145 are to be executed as privileged processes. Additionally or alternatively, the privilege elevation rules can specify that the enrollment agent 151 and all child processes of the enrollment agent 151 are to be executed as privileged processes. The privilege elevation rules can specify the enrollment agent 151 to be executed as privileged processes according to its folder name and path, file name and path, file hash, or a certificate used to sign an enrollment agent 151 file.

The configuration file 155 can include configuration data that is encrypted with the RsaProtectedConfigurationProvider in .NET, or another cryptographic tool. This eliminates the issue of content being shown in clear text for end users, which can be a security risk. When logged in with a console session of the virtualization service 107, an administrator can interact with user interface elements corresponding to "Protect Configuration" and "Unprotect Configuration" to manage the configuration file 155. This will encrypt and decrypt the configuration file, if the user is logged in through the console session rather than through a VDI session or another session of the virtualization service 107. The administrator can make changes and updates to the information in the file, and re-encrypt the file. The system can then be converted to a full clone template that can be used to launch a full clone, or take a snapshot that can be used to launch an instant clone. On logon, the enrollment agent 151 can start up, and verify whether it is accessed through a console session of a management console of the management service 120, or if it is accessed through a virtualization session such as a VDI or RDSH session. The enrollment agent 151 can also have administrative privileges to decrypt the configuration file 155 using RsaProtectedConfigurationProvider in .NET, or another cryptographic tool.

The configuration file 155 can include the management service credentials 183, as well as an endpoint address or identifier of the management service 120, and other information. The configuration file 155 can also include virtualization service credentials 185, as well as an endpoint address or identifier of the virtualization service 107 or a particular virtualization broker 160.

During an enrollment process, the enrollment agent 151 can create tag data 136 that includes tags that identify: virtual device pools 170, virtualization brokers 160, connector services 109, and device type. Each tag can be associated with one or more virtual device 147. In other words, a virtual device 147 can be mapped to respective tags that specify a virtualization broker identifier 161, a virtual device pool identifier 171, a connector service identifier 181. The enrollment agent 151 can also create tag data 136 including a tag with a "virtual device" device type identifier that indicates a virtual device 147 is virtual (e.g., that it is provided using a virtualization service 107) rather than a physical client device 106. The virtual device" device type identifier can identify the virtualization service 107 in order to indicate that the virtual device 147 is virtual rather than physical.

A connector service 109 can manage a set of virtualization brokers 160 of a particular pod. A pod can be provided for a datacenter or local domain environment that uses the virtualization brokers 160 as connection servers. A pod can be associated with a predetermined number of virtualization brokers 160. A connector service 109 instance can manage a subset of tag data 136 for the virtualization brokers 160 of a particular pod or multiple pods. The connector service 109 instance can also manage a subset of tag data 136 for multiple domains and multiple pods of a particular enterprise or customer. A tag in the tag data 136 can specify the connector service identifier 181.

Upon enrollment, a virtual device 147 can be assigned to a tag that specifies the virtual device pool identifier 171 of the virtual device pool 170 of the virtual device 147. The virtual device 147 can also be assigned to a tag that specifies the virtualization broker identifier 161 for its virtualization broker 160. The virtual device 147 can also be assigned to a tag that specifies the connector service identifier 181 of the connector service 109 for that virtualization broker 160. The virtual device 147 can further be assigned to a tag that specifies a "virtual device" identifier that identifies the virtual device 147 as virtual rather than a physical client device 106.

While discussed in the singular for discussion purposes, multiple connector services 109 can be provided. A connector service 109 can communicate with the virtualization services 107 and a management service 120. The connector service 109 can manage mismatches between virtual devices 147 indicated to be enrolled by the management service 120, and virtual devices 147 that are actually provided by the virtualization services 107. The connector service 109 can also manage tag data 136 that is created through the enrollment of virtual devices 147. The connector service 109 can include a connector service identifier 181 that uniquely identifies the connector service 109 among a number of connector services 109.

The connector service 109 can include management service credentials 183 that can authenticate communications between the connector service 109 and the management service 120. The management service credentials 183 can include authorization to read, create, modify, and destroy or delete tag data 136. The management service credentials 183 can include authorization to read and retrieve at least a subset of the user data 127 and the device data 129. In order for the connector service 109 to perform these actions, the management service 120 can provide APIs or other functions that are invoked by the connector service 109 and authenticated using the management service credentials 183.

The connector service 109 can include virtualization service credentials 185 that can authenticate communications between the connector service 109 and the virtualization service 107 or a particular virtualization broker 160. The virtualization service credentials 185 can include authorization to create, modify, destroy or delete, and retrieve information regarding virtual devices 147 provided by the virtualization service 107 or a particular virtualization broker 160. In order for the connector service 109 to perform these actions, the virtualization service 107 or a particular virtualization broker 160 can provide APIs or other functions that are invoked by the connector service 109 and authenticated using the virtualization service credentials 185.

A virtualization service 107 can include one or more virtualization brokers 160. Each virtualization broker 160 can be associated with a virtualization broker identifier 161 that uniquely identifies the virtualization service 107 among a number of virtualization services 107 provided by one or more virtualization broker 160. A virtualization service 107 can also provide one or more virtual device pools 170. A virtual device pool 170 can include a set of virtual devices 147 assigned to a particular group or purpose. The group can include an enterprise group or department, and can include a group of users, client devices 106, and virtual devices 147 utilized for the group. A particular virtual device pool 170 can in some cases include a set of virtual devices 147 provided using a logically defined set of hardware or hosts. A virtual device pool 170 can include a virtual device pool identifier 171 that uniquely identifies the virtual device pool 170 among a number of virtual device pools 170 provided by a virtualization service 107.

Figure 2:
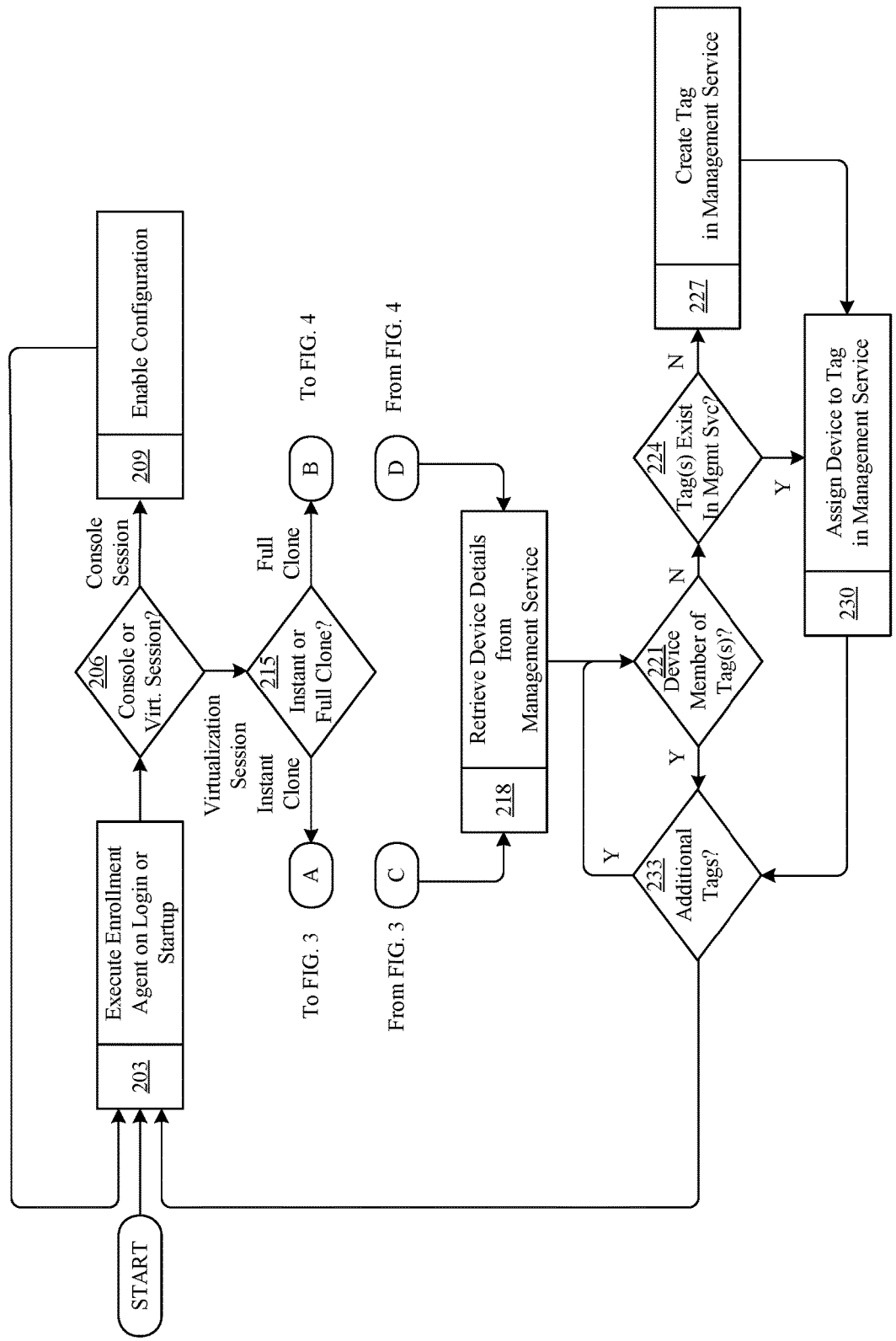
FIG. 2 illustrates a flowchart performed by components of the networked environment that provide virtual device enrollment and management, according to various examples described herein.

FIG. 2 shows a flowchart performed by components of the networked environment 100. The flowchart shows how the components of the networked environment 100 work in concert to enroll and manage virtual devices 147. While the steps of the flowchart are generally discussed as performed by an enrollment agent 151 of a virtual device 147, aspects of the flowchart are also performed by other components of the networked environment 100.

In step 203, the enrollment agent 151 can execute on login or startup of the virtual device 147. The enrollment agent 151 can include a user interface that enables certain features for administration or management. In some cases, the enrollment agent 151 can include a multi-threaded wrapper user interface for the management agent 145 or another component of the virtual device 147. In some examples, the enrollment agent 151 can be written in .NET or another syntax. The enrollment agent 151 can execute with administrative or other elevated privileges as discussed. This enables the enrollment agent 151 to decrypt the configuration file 155. The enrollment agent 151 can read parameters and values from the encrypted configuration file 155 into local variables. The parameters and values can include a virtualization broker identifier 161, a virtual device pool identifier 171, as well as management service credentials 183, and virtualization service credentials 185. The virtualization broker identifier 161 can include or be mapped to a domain name system (DNS) name or another endpoint associated with a virtualization broker 160. The configuration file 155 can include management service credentials 183 to log into the management service 120. The configuration file 155 and the management service credentials 183 can also include a username and password that can be added to an authorization header when making API calls.

In step 206, the enrollment agent 151 can determine whether the current access to the virtual device 147 is a management console session or a virtualization session. The session can include a virtualization session in which a user enters user credentials to access the virtual device 147 from a client device 106. The session can also include a console or management login session where an administrator logs in through a management console of the management service 120 to modify the virtual device 147.

The enrollment agent 151 can identify a session type with the virtual device 147 based on the login or type of access. The enrollment agent 151 can check a registry value or existence of a registry key at a particular registry path in order to check whether the session type is a console session or a virtualization session (e.g., ViewClient_Protocol=BLAST at a particular registry path can indicate a console session). If the session type is identified as a console management session, the process can move to step 209. If the session type is identified as a user or virtualization session, the process can move to step 215.

In step 209, the enrollment agent 151 can enable configuration of the virtual device 147. For example, since the session is a console session, the enrollment agent 151 can decrypt the configuration file 155. In some examples, this can include providing a user interface element within the virtual device 147 that when selected, decrypts the configuration file 155. A console session user can then modify the parameters of the configuration file 155 to configure the virtual device 147 and the enrollment process. Alternatively, the enrollment agent 151 can decrypt the configuration file 155 and an administrative user can interact with a user interface of the management console of the management service 120 in order to modify the parameters of the configuration file 155. The management service 120 can transmit commands to the virtualization service 107 that implement modifications to the parameters of the configuration file 155. The changes to the configuration file 155 and the virtual device 147 can be saved and the console session can end.

Figure 3:
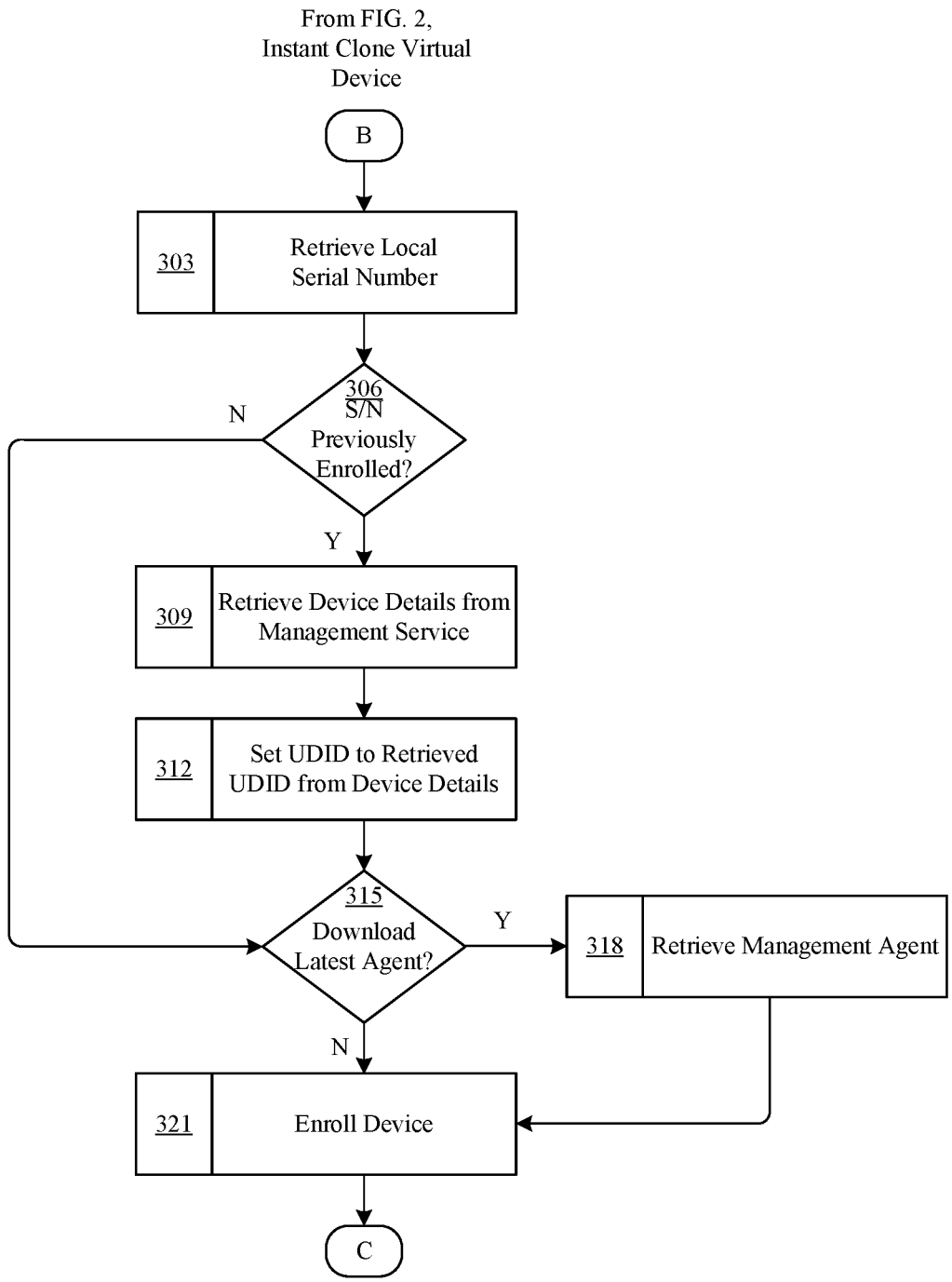
FIG. 3 illustrates another flowchart performed by components of the networked environment that provide virtual device enrollment and management, according to various examples described herein.
Figure 4:
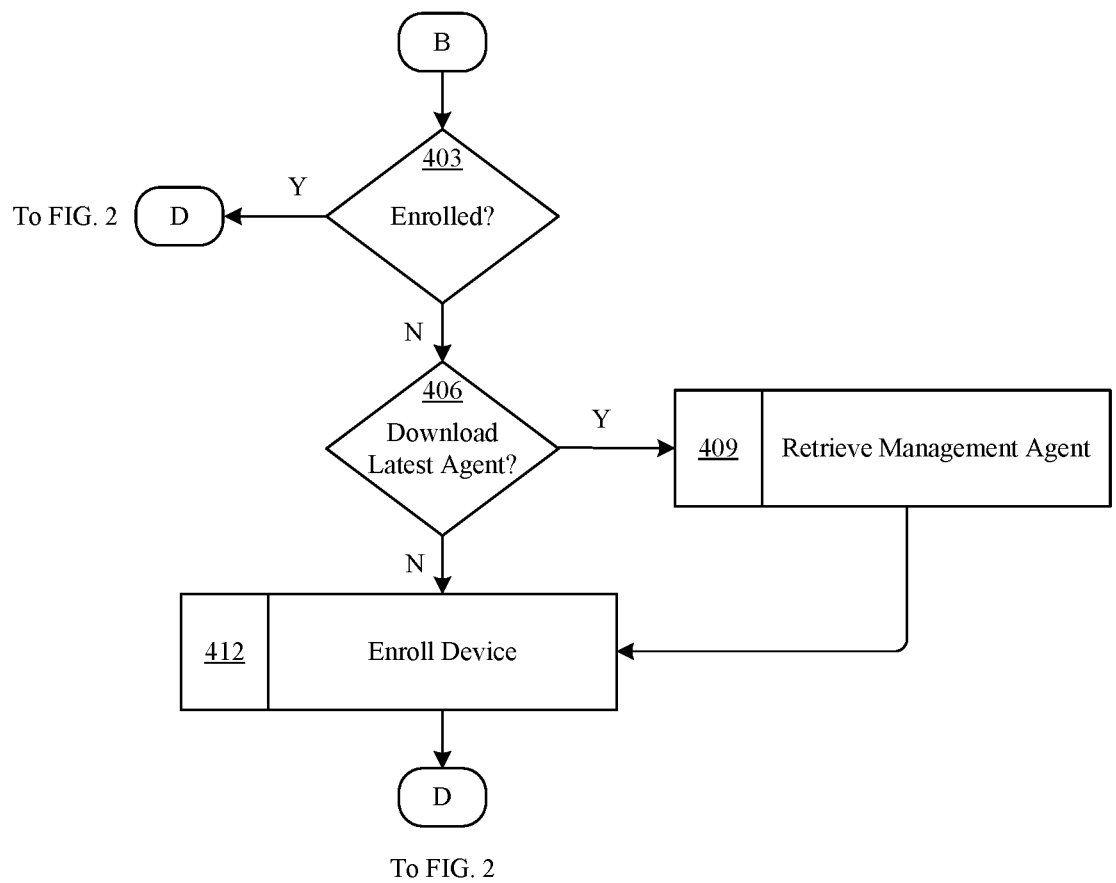
FIG. 4 illustrates another flowchart performed by components of the networked environment that provide virtual device enrollment and management, according to various examples described herein.

In step 215, where the session is a virtualization session, the enrollment agent 151 can determine whether the virtual device 147 is launched as an instant clone or a full clone. The enrollment agent 151 can check a registry value for a registry key (e.g., VMForked=1 at a particular registry path can indicate the virtual machine is forked). If the registry value indicates that the virtual machine is forked, the virtual device 147 is an instant clone. If the registry value indicates that the virtual machine is not forked, the virtual device 147 is a full clone. If the virtual device 147 is an instant clone, the process can move to connector A, which links to the flowchart of FIG. 3. This can include an instant clone specific enrollment process. Once the flowchart of FIG. 3 is performed, the process can move to connector C. If the virtual device 147 is a full clone, the process can move to step B, which links to the flowchart of FIG. 4. This can include a full clone specific enrollment process. Once the flowchart of FIG. 4 is performed, the process can move to connector D.

In step 218, the enrollment agent 151 can retrieve device details from the management service 120. The enrollment agent 151 can identify a device serial number using operating system commands for an operating system of the virtual device 147. For example, the enrollment agent 151 can use Windows Management Instrumentation (WMI) commands such as "wmic bios get serialnumber" to identify the serial number for the virtual device 147. The serial number can be a number assigned by the virtualization service 107 as a provider of the virtual device 147.

The enrollment agent 151 can then request device details from the management service 120 using the serial number. The request can include invoking an API of the management service 120 using the serial number as a parameter to query the device data 129 for the serial number. The management service 120 can identify a device record based on the serial number, and can return device details including a management UUID, an organizational identifier, and a management UDID for the virtual device 147.

In step 221, the enrollment agent 151 can determine whether the virtual device 147 is assigned to the expected tags within the tag data 136 of the management service 120. The enrollment agent 151 can create a local arraylist or another data structure that specifies a predetermined set of expected tags that are to be assigned to the virtual device 147. For example, the virtual device 147 is to be associated with a "virtual device" tag that identifies the virtual device 147 as being virtual rather than a physical client device 106. The virtual device 147 is to be associated with a virtualization broker tag that specifies the virtualization broker identifier 161 of the virtualization broker 160 that provides the virtual device 147. The virtual device 147 is to be associated with a virtual device pool tag that specifies the virtual device pool identifier 171 of the virtual device pool 170 that provides the virtual device 147. As a result, the predetermined set of tags can include the virtual device tag, the virtualization broker tag, and the virtual device pool tag. A tag can include a tag name and a tag identifier. The tag name can in some cases correspond to the virtual device pool identifier 171, the virtualization broker identifier 161, or the "virtual device" identifier that identifies the virtual device 147 as being virtual rather than physical. The tag identifier can include a unique identifier that uniquely identifies the tag among other tags in the tag data 136.

The enrollment agent 151 can invoke an API of the management service 120 to query the tag data 136 for tags that reference the UUID of the virtual device 147. The enrollment agent 151 can create a local arraylist or another data structure that lists the device record tags retrieved using the management UUID of the virtual device 147. Alternatively, the management UDID can be used to search for tags and create a device record tag list in a similar manner. The enrollment agent 151 can then analyze or compare the lists to verify whether the device record includes the expected tags. If the virtual device 147 is a member of, or is assigned to, an expected tag, then the tag also exists in the management service 120, and the process can move to step 233 to check the next expected tag in the list. However, if the virtual device 147 is not a member of, or is unassigned to, an expected tag, then the tag may not exist in the management service 120, and the process can move to step 224.

In step 224, the enrollment agent 151 can determine whether the management service 120 includes one or more of the expected tags. The enrollment agent 151 can use an API or another endpoint of the management service 120 to query for a tag in the expected tag list. The enrollment agent 151 can use the tag name and organizational identifier as parameters to query for the expected tag. If the tag exists in the management service 120, then the process can move to step 230. Otherwise, the process can move to step 227.

In step 227, the enrollment agent 151 can create the tag in the management service 120. The enrollment agent 151 can invoke an API or otherwise instruct the management service 120 to create the tag in the tag data 136 of the management service 120.

In step 230, the enrollment agent 151 can assign the virtual device 147 to the tag. The enrollment agent 151 can invoke an API or otherwise instruct the management service to assign the virtual device 147 to the tag in the tag data 136 of the management service 120. The enrollment agent 151 can provide the tag identifier for the appropriate tag and the management UDID (or management UUID) of the virtual device 147 as parameters to assign the virtual device 147 to the tag.

In step 233, the enrollment agent 151 can check whether there are any additional expected tags to consider. For example, if there are any additional expected tags in the expected tags list, the process can move to step 221. If all expected tags have been analyzed, then the process can move to step 203.

FIG. 3 shows a flowchart performed by components of the networked environment 100. The flowchart shows how the components of the networked environment 100 work in concert to enroll and manage virtual devices 147. Specifically, the flowchart describes a portion of an enrollment process that is specific to instant clone virtual devices 147. While the steps of the flowchart are generally discussed as performed by an enrollment agent 151, aspects of the flowchart are also performed by other components of the networked environment 100.

In step 303, the enrollment agent 151 can retrieve a local serial number of the instant clone virtual device 147. The enrollment agent 151 can identify a device serial number using operating system commands for an operating system of the instant clone virtual device 147. For example, the enrollment agent 151 can use Windows Management Instrumentation (WMI) commands such as "wmic bios get serialnumber" to identify the serial number for the instant clone virtual device 147.

The enrollment process can occur each time the instant clone virtual device 147 is launched. As a result, without special processing, duplicate device records can be created each time it is launched. A particular instant clone virtual device 147 will have the same serial number each time it is launched or accessed. The enrollment agent 151 can use the serial number to check device records prior to enrolling the device.

In step 306, the enrollment agent 151 can determine whether the instant clone virtual device 147 is previously or already enrolled with the management service 120. The enrollment agent 151 can identify whether the virtual device 147 is previously enrolled with the management service 120 using the serial number. The request can include invoking an API of the management service 120 using the serial number as a parameter to query the device data 129 for device records. In some cases, this request can be separate from a request for device details. In other cases, the enrollment agent 151 can identify whether the device is previously enrolled based on whether device details are returned. As a result, the request to identify whether the instant clone virtual device 147 is previously enrolled can be a request to retrieve device details. If device details are received, then the instant clone virtual device 147 is previously or already enrolled with the management service 120, and the process can move to step 309. Otherwise, the process can move to step 315.

In step 309, the enrollment agent 151 can identify device details for the virtual device 147. As indicated above, the enrollment agent 151 can request device details from the management service 120 using the serial number. The request can include invoking an API of the management service 120 using the serial number as a parameter to query the device data 129 for the serial number. The management service 120 can identify a device record based on the serial number, and can return device details including a management UUID, an organizational identifier, and a management UDID for the instant clone virtual device 147. Otherwise, the management service can identify the device details returned in step 306.

In step 312, the enrollment agent 151 can set a local device management parameter to the management UDID that is received from the device record from the management service 120. Alternatively, the management UUID can be used, and the enrollment agent 151 can set a local UUID parameter to the retrieved management UUID that is received from the device record from the management service 120. The enrollment agent 151 can save the management UDID from the device record to a local management variable. The enrollment agent 151 can update a local device management parameter to have the same value of the local management variable, which is the management UDID. The local device management parameter can be a registry key and value in a particular registry path. Otherwise, if the serial number does not exist, the default local device management parameter (e.g., MDMDeviceID) can be used for this value in the enrollment process.

In step 315, the enrollment agent 151 can determine whether to retrieve the latest management agent 145, and the latest enrollment agent 151, in some examples. A parameter in the configuration file 155 can have a value that indicates whether these components are to be downloaded prior to enrollment. In some cases, this can be performed earlier in the process or at another point.

In step 318, the enrollment agent 151 can retrieve an updated management agent 145 from the management service 120. As indicated above, this can also include retrieving an updated enrollment agent 151. This can ensure that enrollment is completed using the latest version of the enrollment agent 151 and management agent 145. This can ensure that once enrollment is completed, the latest version of the management agent 145 is used to configure the instant clone virtual device 147 according to profiles, baselines, and other configurations specified by the compliance rules 131.

In step 321, the enrollment agent 151 can enroll the instant clone virtual device 147 with the management service 120. The enrollment agent 151 can invoke an enrollment API or otherwise transmit a request to enroll the instant clone virtual device 147 with the management service 120. The enrollment process can include providing the local device management parameter value to the management service 120. If the local device management parameter value matches the management UDID (or UUID) of an existing device record in the management service 120, then the existing device record will be updated. However, if the local device management parameter value does not match the management UDID (or UUID) of an existing device record in the management service 120, then a new device record will be created. The process described can prevent or minimize duplicate device records from being created each time an instant clone virtual device 147 is launched.

The enrollment request can be generated by executing a command line enrollment that specifies a file name and path of the management agent 145, an enrollment endpoint address of the management service 120 such as an enrollment API endpoint from the configuration file 155, and the enrollment credentials from the configuration file 155. The enrollment request can be authenticated with the management service 120 based on the enrollment credentials. The enrollment request can also specify the local device management parameter value. The process can then move to connector C, which connects back to FIG. 2.

FIG. 4 shows a flowchart performed by components of the networked environment 100. The flowchart shows how the components of the networked environment 100 work in concert to enroll and manage virtual devices 147. Specifically, the flowchart describes a portion of an enrollment process that is specific to full clone virtual devices 147. While the steps of the flowchart are generally discussed as performed by an enrollment agent 151, aspects of the flowchart are also performed by other components of the networked environment 100.

In step 403, the enrollment agent 151 can determine whether the full clone virtual device 147 is previously enrolled with the management service 120. The enrollment agent 151 can identify the serial number, local device management parameter, or another value. The enrollment agent 151 can then provide the serial number, local device management parameter, or other value to the management service 120. The management service 120 can determine whether any matching device records exist in the device data 129, and provide a result to the enrollment agent 151. If a device record exists, the full clone virtual device 147 is previously enrolled, and the process can move to connector D, which proceeds to FIG. 2. Otherwise, the process can move to step 406.

In step 406, the enrollment agent 151 can determine whether to retrieve the latest management agent 145, and the latest enrollment agent 151, in some examples. A parameter in the configuration file 155 can have a value that indicates whether these components are to be downloaded prior to enrollment. In some cases, this can be performed earlier in the process or at another point.

In step 409, the enrollment agent 151 can retrieve an updated management agent 145 from the management service 120. This can also include retrieving an updated enrollment agent 151. This can ensure that enrollment is completed using the latest version of the enrollment agent 151 and management agent 145. This can also ensure that once enrollment is completed, the latest version of the management agent 145 is used to configure the full clone virtual device 147 according to profiles, baselines, and other configurations specified by the compliance rules 131.

In step 412, the enrollment agent 151 can enroll the full clone virtual device 147 with the management service 120. The enrollment agent 151 can invoke an enrollment API or otherwise transmit a request to enroll the full clone virtual device 147 with the management service 120. The enrollment request can be generated by executing a command line enrollment that specifies a file name and path of the management agent 145, an enrollment endpoint address of the management service 120 such as an enrollment API endpoint from the configuration file 155, and the enrollment credentials from the configuration file 155. The enrollment request can be authenticated with the management service 120 based on the enrollment credentials. The enrollment request can also specify the local device management parameter value. The process can then move to connector D, which connects back to FIG. 2.

Figure 5:
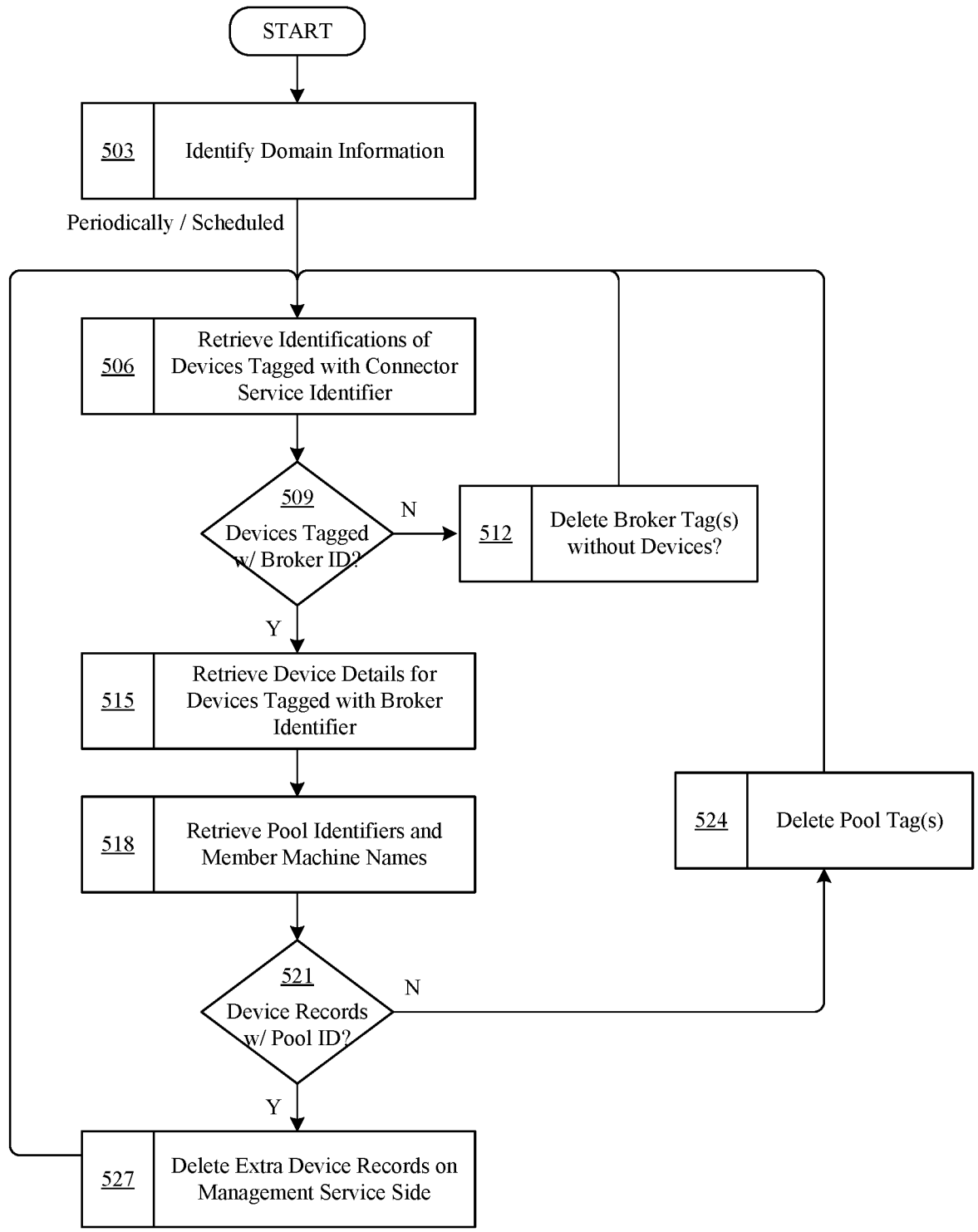
FIG. 5 illustrates another flowchart performed by components of the networked environment that provide virtual device enrollment and management, according to various examples described herein.

FIG. 5 shows a flowchart performed by components of the networked environment 100. The flowchart shows how the components of the networked environment 100 work in concert to enroll and manage virtual devices 147. Specifically, the flowchart describes a how the connector service 109 can integrate the management service 120 with the virtualization service 107 to clean up and manage tag data 136 that can build up as virtual devices 147 are utilized and removed during enterprise activities. While the steps of the flowchart are generally discussed as performed by the connector service 109, aspects of the flowchart are also performed by other components of the networked environment 100.

In step 503, the connector service 109 can identify domain information. This can include multiple domains. The connector service 109 can save this information to local variables. The connector service 109 can use the domain information to identify a pod and all of the virtualization brokers 160 of the pod. A list of virtualization brokers 160 can be saved locally as an arraylist or another data structure. The connector service 109 can append a domain name so each has a fully qualified domain name (FQDN) (e.g., server-.company.com).

The connector service 109 can also identify all virtual device pool identifiers 171 and member machine names or device identifiers for virtual device pools 170 of the virtualization broker 160. The connector service 109 can invoke an API of the virtualization service 107 or the virtualization broker 160 to retrieve the virtualization broker identifiers 161, virtual device pool identifiers 171 and member machine names.

The connector service 109 can store virtual device pool identifiers 171 into an arraylist or another data structure. The connector service 109 can also store a hashtable or another data structure that maps the virtual device pool identifiers 171 to a pool name. The virtual devices 147 can be saved as another hashtable or another data structure for lookup that can use the machine name as a key to retrieve a virtual device pool identifier 171.

In step 506, the connector service 109 can retrieve device data 129 for virtual devices 147 that are assigned to a tag that specifies the connector service identifier 181. The connector service identifier 181 can retrieve this information by invoking an API of the management service 120 and providing the connector service identifier 181 as a parameter. The connector service identifier 181 can use the management service credentials 183 to authenticate communications with the management service 120. The retrieved device identifications can be saved as a device record list, which can be created as an arraylist or another data structure.

In step 509 the connector service 109 can, for each virtualization broker 160 in the list of virtualization brokers 160, determine whether any devices in the device record list are tagged or assigned to the tag with the virtualization broker identifier 161 for that virtualization broker 160. If there are no tagged devices in the device record list, the process can move to step 512. If there are virtual devices 147 assigned to a tag that specifies the virtualization broker identifier 161, then the process can move to step 515.

In step 512, the connector service 109 can delete the broker tags that specify the virtualization broker identifier 161. This can be performed for each broker tag for which there are no devices assigned. The connector service 109 can delete the specified broker tags by invoking an API of the management service 120, and providing the virtualization broker identifier 161 and/or a separate tag identifier of the broker tags.

In step 515, the connector service 109 can retrieve device details for the virtual devices 147 that are tagged with the virtualization broker identifier 161 in the device data 129 of the management service 120. The connector service 109 can invoke an API of the management service 120, and provide the virtualization broker identifier 161 to query the device data 129 for device records that are assigned to the tag that specifies the virtualization broker identifier 161.

In step 518, the connector service 109 can retrieve pool identifiers 171 and machine names of virtual devices 147 that are members of the corresponding virtual device pool 170. The connector service 109 can invoke an API of the virtualization service 107 or a particular virtualization broker 160 that provides all pool identifiers 171 and machine names or identifiers of virtual devices 147 for the virtualization broker identifier 161 from the device data 129 of the management service 120.

In step 521, the connector service 109 can cycle through virtual device pool identifiers 171 and determine whether there are any devices in the device record list that are associated with each virtual device pool identifier 171. If there are no device records with the virtual device pool identifier 171, the connector service 109 can move to step 524. If there are device records that include the virtual device pool identifier 171, the process can move to step 527.

In step 524, the connector service 109 can delete the pool tags that include virtual device pool identifiers 171 that are not associated with any enrolled devices in the device records. The connector service 109 can invoke an API of the management service 120 to delete the tags according to the tag identifier and/or virtual device pool identifier 171.

In step 527, the connector service 109 can delete device records from the management service 120 for which there is no associated virtual device 147 on record with the virtualization service 107. In other words, if there are extra device records on the management service 120 side, the connector service 109 can delete those device records from the management service 120. The connector service 109 can invoke an API of the management service 120 to delete the extra device records from the device data 129. If there are extra virtual devices 147 on record with the virtualization service 107, they may by launched but are still in the enrollment process. As a result, the connector service 109 does not delete them. However, the connector service 109 can transmit a notification to the management service 120, which can be provided through the console user interface for administrative attention.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The cloud computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the various components described, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method, comprising:
retrieving, by an enrollment agent executed in a virtual device, a serial number of the virtual device using an operating system command that identifies the serial number locally to the virtual device;
transmitting, by the enrollment agent to a management service, a request to identify device records with the management service, wherein transmitting the request comprises invoking an Application Programming Interface (API) of the management service using the serial number as a parameter and wherein the request is authenticated using management service credentials decrypted from an encrypted configuration file that is decrypted by the enrollment agent;
receiving, by the enrollment agent, a management identifier of a device record that is associated with the serial number;
setting, by the enrollment agent, a local device management parameter of the virtual device to specify the management identifier; and
transmitting, from the virtual device to the management service, an enrollment request to enroll the virtual device with the management service.

2. The method according to claim 1, wherein the management service updates the device record rather than creating a new device record based at least in part on the local device management parameter of the virtual device specifying the management identifier.

3. The method according to claim 1, further comprising:
retrieving, by the enrollment agent from the management service, at least one of: a latest version of a management agent that enforces compliance rules specified by the management service, and a latest version of the enrollment agent.

4. The method according to claim 1, wherein a management agent transmits the request to enroll the virtual device with the management service.

5. The method according to claim 1, wherein the enrollment agent comprises a wrapper that wraps a management agent.

6. The method according to claim 1, wherein the management identifier comprises at least one of a unique device identifier (UDID) or a universally unique identifier (UUID) created by the management service for the device record during a previous enrollment process.

7. A non-transitory computer-readable medium embodying instructions executable by at least one computing device, the instructions, when executed, causing the at least one computing device to at least:
retrieve, by an enrollment agent executed in a virtual device, a serial number of the virtual device using an operating system command that identifies the serial number locally to the virtual device;
transmit, by the enrollment agent to a management service, a request to identify device records with the management service, wherein transmitting the request comprises invoking an Application Programming Interface (API) of the management service using the serial number as a parameter and wherein the request is authenticated using management service credentials decrypted from an encrypted configuration file that is decrypted by the enrollment agent;
receive, by the enrollment agent, a management identifier of a device record that is associated with the serial number;
set, by the enrollment agent, a local device management parameter of the virtual device to specify the management identifier; and
transmit, from the virtual device to the management service, an enrollment request to enroll the virtual device with the management service.

8. The non-transitory computer-readable medium according to claim 7, wherein the management service updates the device record rather than creating a new device record based at least in part on the local device management parameter of the virtual device specifying the management identifier.

9. The non-transitory computer-readable medium according to claim 7, wherein the instructions, when executed, cause the at least one computing device to at least:
retrieve, by the enrollment agent from the management service, at least one of: a latest version of a management agent that enforces compliance rules specified by the management service, and a latest version of the enrollment agent.

10. The non-transitory computer-readable medium according to claim 7, wherein a management agent transmits the request to enroll the virtual device with the management service.

11. The non-transitory computer-readable medium according to claim 7, wherein the enrollment agent comprises a wrapper that wraps a management agent.

12. The non-transitory computer-readable medium according to claim 7, wherein the management identifier comprises at least one of a unique device identifier (UDID) or a universally unique identifier (UUID) created by the management service for the device record during a previous enrollment process.

13. A system, comprising:
at least one computing device; and
instructions accessible by the at least one computing device, wherein the instructions, when executed, cause the at least one computing device to at least:
retrieve, by an enrollment agent executed in a virtual device, a serial number of the virtual device using an operating system command that identifies the serial number locally to the virtual device;
transmit, by the enrollment agent to a management service, a request to identify device records with the management service, wherein transmitting the request comprises invoking an Application Programming Interface (API) of the management service using the serial number as a parameter and wherein the request is authenticated using management service credentials decrypted from an encrypted configuration file that is decrypted by the enrollment agent;
receive, by the enrollment agent, a management identifier of a device record that is associated with the serial number;
set, by the enrollment agent, a local device management parameter of the virtual device to specify the management identifier; and
transmit, from the virtual device to the management service, an enrollment request to enroll the virtual device with the management service.

14. The system according to claim 13, wherein the management service updates the device record rather than creating a new device record based at least in part on the local device management parameter of the virtual device specifying the management identifier.

15. The system according to claim 13, wherein a management agent transmits the request to enroll the virtual device with the management service.

16. The system according to claim 13, wherein the enrollment agent comprises a wrapper that wraps a management agent.

17. The system according to claim 13, wherein the management identifier comprises at least one of a unique device identifier (UDID) or a universally unique identifier (UUID) created by the management service for the device record during a previous enrollment process.

* * * * *